United States Patent Office 3,709,958
Patented Jan. 9, 1973

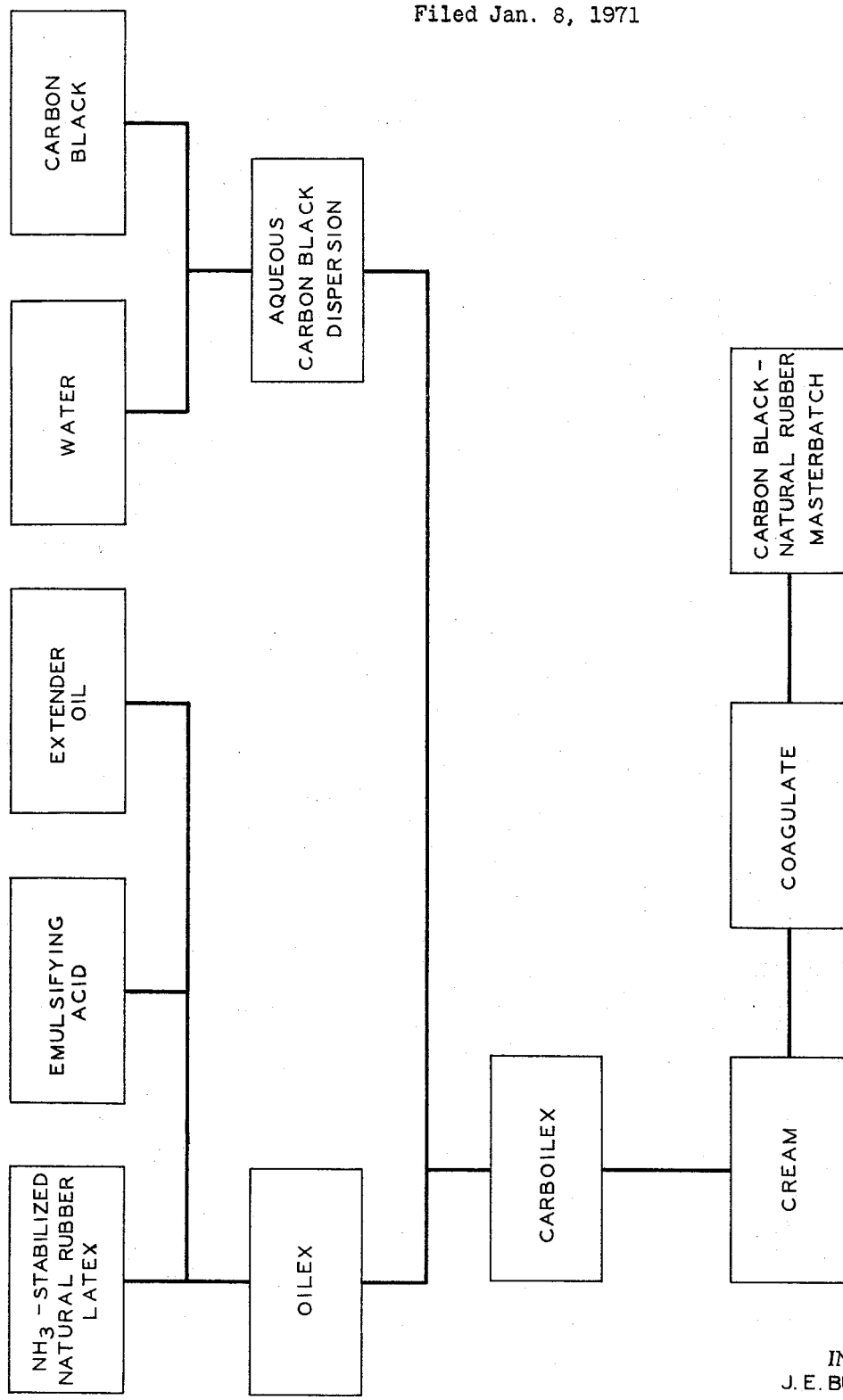

3,709,958
NATURAL RUBBER MASTERBATCHES
John E. Burleigh, Bartlesville, Okla., assignor to Phillips Petroleum Company, Bartlesville, Okla.
Filed Jan. 8, 1971, Ser. No. 104,984
Int. Cl. C08c 11/22
U.S. Cl. 260—754      8 Claims

ABSTRACT OF THE DISCLOSURE

Natural rubber-extender oil-carbon black masterbatches are prepared by addition of a mixture of a fatty acid and extender oil to an ammonia-stabilized natural rubber latex and adding a carbon black dispersion to the resulting oilex. The carboilex which results from the admixture is then creamed and coagulated by conventional procedures.

This invention relates to natural rubber compositions. More particularly, the invention relates to masterbatching natural rubbers.

In preparing articles from natural and synthetic rubbers, it is customary to incorporate various additives into the rubber compounds prior to the vulcanization step to modify the properties of such compositions. For example, it is conventional to add carbon black to natural and synthetic rubbers to modify such compositions with respect to tensile strength, modulus of elasticity, electrical conductivity, hysteresis loss, abrasion resistance and the like.

The additives can be added by dry mixing but such procedures generally require large amounts of power to work the rubbery compounds and, in addition, many of the additives are difficult to disperse in the elastomers. One of the more disagreeable operations in rubber processing involves the handling of carbon black. In order to alleviate the problems of incorporating desired additives with the elastomer, various procedures have been developed to incorporate the additives into the elastomer at the latex stage. Among such procedures is the incorporation of carbon black in synthetic rubber latexes to form carbon black masterbatches, i.e., a premix of carbon black and synthetic rubber. The latex masterbatching of carbon blacks and synthetic rubbers is a convenient method for reinforcing elastomers of this type because of the relative particle size of the elastomer latex and carbon black and the relative number of each present in the carbon black slurry-latex mixtures required for properly pigmented compounds. While such latex masterbatching has been found effective in synthetic rubber, attempts to devise methods for producing natural rubber-carbon black masterbatches have generally resulted in materials of inferior physical properties.

It has now been discovered that natural rubber-carbon black masterbatches having commercially acceptable physical properties can be prepared by incorporating into an ammonia-stabilized natural rubber latex a mixture of a fatty acid and an extender oil to form an oilex; and adding to this oilex a carbon black dispersion to form a carboilex. The resulting mixture is then creamed and coagulated by conventional procedures.

Thus, according to the invention, natural rubber-oil-carbon black masterbatches are prepared by first adding to an ammoniated natural rubber latex a mixture comprising an extender oil and an organic carboxylic acid which has the property of reacting with the ammonia in the rubber latex to form in situ the emulsifier for the oil. The carbon black is separately dispersed in water and added to the oilex to form a stable carboilex. The carboilex is then creamed and coagulated by conventional procedures, as by the addition of calcium chloride and dilute sulfuric acid, to form a satisfactory rubber crumb. The crumb size can be adjusted, i.e., increased if desired, by the addition of minute quantities of natural rubber latex, oilex, or an oil emulsion to the acid coagulation mixture.

Accompanying and forming a part of this application is a drawing showing, in schematic form, a process flow diagram suitable for practicing the invention. The flow sheet is considered self-explanatory, and will not be discussed in further detail.

As used in this application, the term "extender oil" is meant to include all of the known extender materials heretofore suitable for use in extending synthetic rubbers.

The extender oils which are suitable for use in the process of the invention are thus well known and hundreds have been described in the literature. Such oils are preferably petroleum oils which have been designated naphthenic, aromatic or paraffinic according to the prior art usage but now are described under an ASTM classification system (ASTM D 2226–63T). Representative of the known extender oils are petroleum distillates, vegetable oils such as linseed and soybean oils, esters such as butyl Cellosolve pelargonate, di-n-hexyl adipate, and trioctyl phosphate; ethers; ketones; terpenes; gum turpentine; rosin; pine tar; coal tar products such as liquids from distillates, including alkyl naphthalene and polynuclear aromatics, and semisolids from coal tar, including low molecular weight polymers of cumarone-indene and related resins; liquid polymers of conjugated dienes such as liquid polybutadiene and liquid polyisoprene; and clay tower polymers.

It has been found that when one follows the particular sequence of process steps set forth herein that the amount of extender oil which is blended to form the carbon black-oil-natural rubber masterbatches according to this invention can be within the range normally employed in preparing masterbatches of synthetic rubbers. Thus, the amount of extender oil will normally be in the range of 10 to 250 parts by weight of oil per 100 parts by weight of rubber with amounts in the range of 25 to 100 parts of oil per 100 parts of rubber being presently preferred.

It is essential to the preparation of natural rubber-carbon black masterbatches according to this invention that there be admixed with the extender oil an emulsifier-forming acid before mixing the oil with the ammonia-stabilized natural rubber latex. While any of the known organic acids which are capable of reacting with a base such as ammonia to form soap-type materials can be used, the emulsifier-forming acid is preferably a monocarboxylic fatty acid having from 8 to 24 carbon atoms, especially 8 to 18 carbon atoms, with oleic acid being presently preferred. Other representative fatty acids include stearic acid, lauric acid, undecylenic acid, capric acid and caprylic acid. In forming the oil/emulsifier-forming acid mixture, the acid is used in an amount of at least 2 parts by weight of acid per 100 parts by weight of extender oil. Quite often it will be desirable to add a stabilizer to the oil by the addition thereto of known antioxidant additives generally in the range of from 0.5–3 parts by weight per 100 parts by weight of rubber, the addition of said additives requiring that the amount of emulsifier-forming acid be adjusted upward. Generally, the emulsifier-forming acid will be employed in an amount in the range of at least 2 parts by weight of acid per 100 parts by weight of extender oil to about 5 parts by weight of emulsifier-forming acid per 100 parts by weight of extender oil. As noted, the addition of antioxidants to the oil requires that the amount of acid be adjusted upward. Thus, when antioxidants are added to the oil, it is presently preferred to use amounts of acid in the upper part of the range, e.g., from 2.25–5 parts by weight of acid per 100 parts of extender oil. Although larger amounts may be used, little advantage is to be gained using amounts of emulsifier-forming acid in excess of 5 parts by weight per 100 parts by weight of oil.

A second critical feature of the invention is the use of natural rubber latexes which have been stabilized with ammonia. Such latexes will generally comprise aqueous solutions containing from 10 to 60 weight percent solids with latexes containing in the range of about 30 percent solids being presently preferred. Such latexes will normally be stabilized with an excess of ammonia, the amount of ammonia being such as to provide a basic solution following the addition of the extender oil which contains the emulsifier-forming acid and, optionally, any antioxidant. In other words, the latex must contain sufficient ammonia to (1) react with the emulsifier-forming acid to form in situ the oil emulsifier and (2) still provide a basic environment having a pH in the range of about 8 to 11.

The ammonia-stabilized natural rubber latex and the extender oil which contains the emulsifier-forming acid are homogeneously blended to provide a stable oilex. To the stable oilex is added an aqueous dispersion of carbon black containing at least 3 parts by weight of an appropriate dispersant per 100 parts by weight of carbon black. The dispersant or dispersing agents which are suitable for use in the invention can be selected from any of those previously used in the art in preparing dispersions of carbon black in water and include such dispersing agents as the dry sodium salt of crude tall oil; the potassium salt of disproportionated wood rosin; polymerized potassium salts of alkyl naphthalene sulfonic acids; alkali metal lignosulfonates; isooctylphenyl polyethoxyethanol; and alkali metal salts of carboxylated polyelectrolytes. A presently preferred dispersing agent is sold under the trademark Tamol 731 which is the sodium salt of a copolymer of maleic anhydride and diisobutylene generally provided in the form of a 25 percent aqueous solution. Also suitable for use as dispersants are alkali metal salts of alkyl sulfates and alkyl benzene sulfonates. Sodium lauryl sulfate, because it is readily available commercially, is the preferred sulfate. However, salts containing 8 to 18 carbon atoms in the chain can also be used. Examples include sodium n-octyl sulfate, potassium capryl sulfate, lithium n-decyl sulfate, rubidium myristyl sulfate, cesium cetyl sulfate, and sodium stearyl sulfate. Mixtures can be used. A common source for the production of the sulfates is the mixture of fatty alcohols made by reducing the mixed fatty acids of coconut oil. This mixture consists of about 15 percent mixed $C_8$ and $C_{10}$ alcohols, 40 percent $C_{12}$ alcohol, 30 percent $C_{14}$ alcohol and 15 percent mixed $C_{16}$ and $C_{18}$ alcohols. Various cuts of this mixture are also used.

In the class of sulfonates, the sodium salt of sodium dodecylbenzene sulfonate is the most widely used. As long as the sulfonate contains an alkyl group of 8 to 18 carbon atoms, it is suitable for use in this invention. Examples in addition to sodium dodecylbenzene sulfonate include lithium octylbenzene sulfonate, sodium nonylbenzene sulfonate, potassium decylbenzene sulfonate, rubidium undecylbenzene sulfonate, cesium tridecylbenzene sulfonate, lithium ethyldodecylbenzene sulfonate, sodium hexadecylbenzene sulfonate and potassium octadecylbenzene sulfonate. Mixtures can be used. In some cases a commercial product contains sulfonates with a mixture of alkyl groups. One such material is the alkarylbenzene sulfonate prepared by alkylating benzene with a kerosene fraction having an average of about 14 carbon atoms per molecule.

Alkali metal lignosulfonates are another class of suitable dispersants. Lithium, sodium, potassium, rubidium and cesium lignin sulfonates can be used. The sodium and potassium lignin sulfontes are preferred. Sodium lignin sulfonate is presently commercially available, a process for its production being given in Industrial and Engineering Chemistry 50, No. 4, 570–576 (1958). Also described in this article are the partial desulfonated lignin sulfonates which can also be used in the process of my invention.

The amount of black in the aqueous dispersion can vary over a fairly broad range, and is generally in the range from 2 to 15 weight percent, preferably from 3 to 10 weight percent. The amount of black used should be less than that which produces a stiff paste. The amount of carbon black dispersion used depends, of course, upon the amount of black desired in the rubber. The range of 10 to 150 parts by weight of black per 100 parts by weight of rubber is commonly used. An amount within the range of 20 to 80 parts of black on the same basis is presently preferred.

The carboilex resulting from the admixture of oilex and aqueous carbon black dispersion is creamed and coagulated according to conventional methods to form a grainy, free flowing crumb. Should the carboilex appear to be unstable, additional carbon black dispersion should be added; however, the addition of additional carbon black dispersion should only be effected in the presence of an adequate amount of oil emulsifier. Thus, it may be necessary to add more ammonia and/or emulsifier-forming acid to the system prior to adding of the additional carbon black dispersion. Crumb size, if too small, can be adjusted by the addition of minute quantities of natural rubber latex, oilex, or an oil emulsion to the acid coagulation mixture.

The following example is representative of the process of this invention.

EXAMPLE (A) Preparation of oilex

A commercially available high solids (61 wt. percent solids) natural rubber latex stabilized with ammonia (0.73 wt. percent $NH_3$) was diluted with deionized water to 35 wt. percent solids which is typical of a field latex concentration. The diluted latex was then employed to prepare the oilex according to the recipe shown below.

Oilex recipe

|  | Parts by weight |
|---|---|
| Natural rubber latex (35% solids) | a 286 |
| Extender oil b | 20 |
| Antioxidant c | 1.8 |
| Oleic acid | 0.45 | a This amount of the latex contains 100 parts by weight of rubber.
b Naphthenic oil, ASTM D 2226–63T Type 103. Specific gravity 0.9267. Viscosity (100° F.) 760 SUS. Flash point, 410° F. Aniline point, 179° F.
c Tris-nonylphenylphosphite.

The oilex was prepared by adding the oleic acid and then the antioxidant to the oil. This mixture was then added to the ammonia-stabilized latex. The resulting oilex was tested with pH paper to insure that excess ammonia was present and was observed to be stable for several weeks.

(B) Preparation of carbon black dispersion

Carbon black (ASTM D 2516–66T, Type N 220) was dispersed in deionized water in the presence of a dispersing agent in a high shear mixing device. The recipe employed for the carbon black dispersion is shown below.

Carbon black dispersion recipe

|  | Parts by weight |
|---|---|
| Deionized water | 2035 |
| Dispersing agent a | 3.2 |
| Carbon black (pelleted) | 100 |
| pH 10.1–10.3. |  | a Sodium salt of a copolymer of diisobutylene and maleic anhydride.

The carbon black dispersion was prepared by adding the required amount of dispersing agent to the water with stirring. Mixing was then stopped and the carbon black pellets added quickly. Mixing was then resumed and maintained under high shear conditions for at least five minutes. The resulting carbon black dispersion was stable for several days.

(C) Preparation of oil-black masterbatch

The carbon black dispersion prepared as described above was mixed with the oilex in about a 4:1 weight ratio with stirring.

The resulting carboilex was creamed with an aqueous $CaCl_2$ solution (17.8 g. $CaCl_2$ per liter of $H_2O$) just prior to coagulation. The creamed carboilex was added rapidly with stirring to hot (158° F.) dilute $H_2SO_4$ (42 ml. concentrated $H_2SO_4$ in about 23 l. deionized water) to coagulate the mixture. The coagulum (masterbatch) was separated by filtration and then washed four times with hot (122–140° F.) water. The masterbatch was dried at 158° F. in an air oven.

(D) Masterbatch analyses

The masterbatch prepared as described above was analyzed with the following results:

| | Masterbatch results |
|---|---|
| Recovery yield, percent [a] | 97.8 |
| Carbon black, wt. percent | 32.9 |
| Ash, wt. percent | 0.10 |
| Moisture, wt. percent | 0.2 |

[a] Yield corrected for moisture content.

(E) Masterbatch compounding and evaluation

Five other masterbatches of comparable size to the one just described (1–2 lbs.) were prepared under essentially the same conditions as described above. The six masterbatches were then blended and compounded in a tire tread formulation for tire testing evaluation. The control stock in this evaluation was natural rubber obtained by coagulation of a portion of the "parent" latex which was used in the preparation of the oil-black masterbatches. The compounding recipes employed are shown below.

COMPOUNDING RECIPE

| | Parts by weight | |
|---|---|---|
| | Masterbatch | Control |
| Polymer or masterbatch | 180 | 100 |
| Carbon black (N220) | | 60 |
| Naphthenic oil | | 20 |
| Zinc oxide | 3 | 3 |
| Stearic acid | 3 | 3 |
| Flexamine [a] | 1 | 1 |
| Flexzone 3C [b] | 2 | 2 |
| Vultrol [c] | 1 | 1 |
| Sulfur | 2.5 | 2.5 |
| NOBS Special [d] | 0.60 | 0.60 |

[a] A powder having a specific gravity of 1.10, and a M.P. 75–90° C., consisting of a physical mixture containing 65% of a complex diarylamine-ketone reaction product and 35% of N,N'-diphenyl-p-phenylenediamine.
[b] N-isopropyl-N'-phenyl-p-phenylenediamine.
[c] N-nitrosodiphenylamine.
[d] N-oxydiethylene-2-benzothiazolesulfenamide.

PROPERTIES

| | Masterbatch | Control |
|---|---|---|
| Mooney viscosity,[h] ML–4 at 212° F.: | | |
| Raw | 90 | 86 |
| Compounded | 39 | 42 |
| Processing properties: [a] | | |
| Extrusions at 250° F., Garvey die: [b] | | |
| Inches/minute | 40 | 42 |
| Grams/minute | 82 | 89 |
| Appearance rating (12 best) | 11– | 11 |
| Cured dispersion rating (10 best) [c] | 9 | 9 |
| Physical properties (cured 45 min. at 293° F.): | | |
| 300% modulus, p.s.i.[d] | 1,200 | 1,600 |
| Tensile, p.s.i.[d] | 3,600 | 3,900 |
| Elongation, percent [d] | 600 | 550 |
| ΔT,° F. [e] | 52 | 50 |
| Resilience, percent [f] | 71 | 69 |
| Shore A hardness [g] | 51 | 55 |

[a] Stocks mixed in an internal mixer (BR Banbury).
[b] Ind. Eng. Chem., 34, 1309 (1942).
[c] Rubber World, 151, No. 3, 41 (1964).
[d] ASTM D 412–66.
[e] ASTM D 623–62.
[f] ASTM D 945–59.
[g] ASTM D 1706–61.
[h] ASTM D 1646–63.

The above tread stocks were applied to new tire carcasses (8.55 x 15) which had been buffed free of new tread and then tested for wear properties during 17,741 miles of public highway driving at an average temperature of about 45° F. The results obtained are shown below.

TIRE WEAR PERFORMANCE

| | Masterbatch | Control |
|---|---|---|
| Miles/0.001 inch of tread | 87 | 91 |
| Precut crack growth,[a] inches | 1.22 | 2.21 |

[a] Precut in each tread groove, 0.100 inch deep, 0.250 long.

The results of the above tests and the evaluation of the two rubber stocks in tire tread formulations demonstrate that the natural rubber-oil-black masterbatch of this invention was essentially equivalent to the natural rubber "dry mixed" control.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A process for incorporating carbon black and extender oil in natural rubber compositions comprising:
   forming an admixture of 100 parts by weight of extender oil and at least 2 parts by weight of at least one emulsifier-forming organic carboxylic acid containing from 8 to 24 carbon atoms;
   admixing said organic acid-containing extender oil and ammonia-stabilized natural rubber latex to form a stable oilex having a pH in the range of 8 to 11, in a ratio of 10 to 250 parts by weight of extender oil per 100 parts by weight of natural rubber;
   admixing said oilex and an aqueous dispersion of carbon black containing from 2 to 15 weight percent of carbon black, said aqueous dispersion containing at least 3 parts by weight of dispersant per 100 parts by weight of carbon black, to form a stable carboilex, in a ratio of 10 to 150 parts by weight of carbon black per 100 parts by weight of natural rubber;
   coagulating said carboilex; and
   separating the coagulum thus formed.

2. A process according to claim 1 wherein the amount of extender oil is in a ratio of 25 to 100 parts by weight of extender oil per 100 parts by weight of natural rubber.

3. A process according to claim 2 wherein said aqueous dispersion of carbon black contains from 3 to 10 weight percent of carbon black.

4. A process according to claim 3 wherein the amount of carbon black is in a ratio of 20 to 80 parts by weight of carbon black per 100 parts by weight of natural rubber.

5. A process according to claim 1 wherein said admixture of extender oil and emulsifier-forming acid has incorporated therein an antioxidant material.

6. A process according to claim 2 wherein said admixture of extender oil and emulsifier-forming acid has incorporated therein an antioxidant material.

7. A process according to claim 4 wherein said admixture of extender oil and emulsifier-forming acid has incorporated therein an antioxidant material.

8. A process according to claim 1 comprising:
   (a) forming an admixture comprising 20 parts by weight of extender oil, 0.45 part by weight of oleic acid and 1.8 parts by weight of tris-nonylphenylphosphite;
   (b) admixing the admixture of (a) with 100 parts by weight of ammonia-stabilized natural rubber in the form of a latex to form a stable oilex;
   (c) admixing with the oilex of (b) in a weight ratio of 4:1 a carbon black dispersion formed by mixing 100 parts by weight of carbon black, 2035 parts by weight of water, 3.2 parts by weight of sodium salt of a copolymer of diisobutylene and maleic anhydride to form a carboilex;

(d) creaming said carboilex with aqueous calcium chloride;

(e) coagulating said creamed carboilex with sulfuric acid; and (f) recovering the natural rubber-carbon black-extender oil coagulum thus formed.

References Cited

UNITED STATES PATENTS

| | | | |
|---|---|---|---|
| 3,092,603 | 6/1963 | Gauslaa et al. | 260—759 |
| 1,952,041 | 3/1934 | Murphy et al. | 260—41.5 MP |
| 2,743,305 | 4/1956 | Townsend | 260—820 |

OTHER REFERENCES

Noble—Latex in Industry (Rubber Age) (N.Y.) (1953), pp. 223–225, 230–234.

Stumpf—Chem. Abs. 48, 12427–12428 (1954).

Materials & Compounding Ingredients for Rubber (Rubber World) (N.Y.) (1968), p. 115.

MORRIS LIEBMAN, Primary Examiner

H. H. FLETCHER, Assistant Examiner

U.S. Cl. X.R.

260—743, 746, 752, 759, 763